United States Patent [19]
Bledin

[11] Patent Number: 6,144,790
[45] Date of Patent: Nov. 7, 2000

[54] CONTACT FIBER OPTIC IMPACT SENSOR

[76] Inventor: Anthony G Bledin, 1921 Smokey Ridge Ave., Thousand Oaks, Calif. 91362

[21] Appl. No.: 08/796,205

[22] Filed: Feb. 7, 1997

[51] Int. Cl.[7] .................................................. G02B 6/00
[52] U.S. Cl. .......................... 385/121; 385/13; 385/50; 385/38; 257/227.15; 257/227.14; 356/345
[58] Field of Search ........................ 385/12, 11, 13, 385/31, 32, 38, 39, 50, 123, 116; 257/227.17, 227.14, 227.19, 227.27, 227.24, 227.15, 231.1, 227.21; 356/345, 350, 358; 372/6

[56] References Cited

U.S. PATENT DOCUMENTS

| | | | |
|---|---|---|---|
| 4,682,895 | 7/1987 | Costello | 385/12 X |
| 4,843,233 | 6/1989 | Jeunhomme | 250/227.24 |
| 4,882,716 | 11/1989 | Lefevre et al. | 356/345 X |
| 5,012,088 | 4/1991 | Cole et al. | 250/227.19 |

*Primary Examiner*—Phan T. H. Palmer
*Attorney, Agent, or Firm*—Colin P. Abrahams

[57] ABSTRACT

A fiber optic sensor is provided which is useful for detecting impact, pressure or other forces, and has particular application in detecting the presence of a foreign object in an electronically operated vehicle window including a motor, a frame and a window pane movable in the frame between an open and a closed position. The sensor comprises a fiber optic having one end connected to a light source, with the other end being connected to a detector. In the fiber optic, there is located a sensing portion fiber which is preferably located in the frame of the window so as to modulate light traveling in an optical path in the fibre optic in response to detection of the foreign object which comes into contact therewith. The sensor further comprises a signal propagating means for transmitting a signal to the motor when the optical path is modulated so as to stop or reverse the motor.

5 Claims, 10 Drawing Sheets

CONTACT FIBER OPTIC IMPACT SENSOR

BACKGROUND OF THE INVENTION

1. Field of the Invention

The general field of the invention is the area of fiber optics. In the present invention fiber optics are used for sensing or detecting vibration, impact or pressure. The sensor system uses a multimode fiber sensor as its sensing element coupled to a light source and a light detector. Intensity variation of optical power in response to perturbation of the sensing fiber via static and dynamic disturbance of the sensing fiber geometry changes the optical energy received by the light detector.

2. Description of the Related Prior Art

Fiber optic sensors can be classified into Extrinsic and Intrinsic fiber optic sensors. (Eric Udd "Fiber Optic Sensors" An introduction for engineers and Scientist 1990).

Extrinsic or hybrid fiber optic sensors are sensors in which light transits into and out of the fiber to reach the sensing region. The fibers serve as a conduit for transmitting the light and the fiber does not come directly into contact with the substrate that is measured. Such inventions are characterized as extrinsic sensors, and are not related to the art of the invention described herein. Examples of extrinsic fiber optic sensors include Laser Doppler velocimetry, Fluorescence and Reflection and Transmission sensors.

Intrinsic or all-fiber optic sensors are sensors in which the environmental effect is converted to a light signal within the fiber. The sensing fibers of Intrinsic fiber optic sensors come directly into contact with the article or substance sensed and any change in the physical environment is translated into a change in the optical transmission through the sensing optical fiber system. The invention described herein falls into this category.

The close analogy to the invention described herein is the multimode fiber microbend intensity sensor. Light loss in the microbend fiber sensing system depends upon reducing the amount of light transmitted through the fiber by distorting the fiber geometry. Distortion of this geometry scatters the light out of the core into the cladding thus decreasing the total light transmitted through the fiber. This is typically achieved by compressing the fiber between two ridged plates, with the ridges of opposing plates arranged in a complementary fashion so as to periodically deform the fiber. Such a microbend intensity sensor is simple and relatively inexpensive, however, it is not a sensitive detector to pressure or vibrations and requires large lengths of sensing fiber coupled to mechanical devices to deform the fiber. The current invention overcomes non-sensitivity of the microbend sensor and can arbitrarily be considered as a "Multimode Fiber Speckle Sensor." Such sensors are describe below:

In "Optical Fiber Communications Systems" by C. P. Sandbank, published by John Wilely & Son of New York, 1980, pp 249–265, describes that in a multimode optical fiber illuminated at a first face by a coherent light, that the light follows different optical paths within the fiber. Each optical path is modulated differently by external disturbances, such as vibrations, temperature andl/or pressure variations. At the output face of the optical fiber, the modes of the multimode optical fiber are combined so as to form an interference pattern with a granular mottled appearance called "speckle." The changes in the speckle produced by external phenomena on the multimode fiber are used to form various "speckle mode sensors" such as:

A Fluid flow measurement sensor, described by J. H. Lyle and C. W. Pitt in "Electronics Letters" of the Mar. 19, 1981. vol 17 no. 6, pp. 244–245. The sensor system described comprised a multimode optical fiber in the fluid stream, illuminated at its input by helium neon laser emitting coherent light. A speckle, formed at the output end of the multimode optical fiber by vibrations produced in the vicinity of the fiber by flow of the fluid adjacent to the multimode fiber, is observed by a photodetector disposed at 15 cm. from this output end, the output signal of the photodetector being displayed on an audiofrequency spectrum analyzer;

Chung-yee Leung, 1-fan Chang and Si-Hsu have described in the "Proceedings of the Fourth International Conference on Optical Fiber Sensors" Tokyo Oct. 7–9, 1986, an intrusion detection device. The device comprises a multimode optical fiber illuminated by a laser whose light is focused on the input end of the multimode optical fiber disposed in a practically closed loop and whose speckle appears on the output face of this fiber. This speckle is detected by several photodetectors of small size disposed in the vicinity of the center of the speckle, the output signals of the photodetectors, being amplified, filtered (by band-pass filters of 10 to 200 Hz), rectified, added and blocked.

In U.S. Pat. No. 4,843,233 issued to Lue Jeunhomme on Jun. 27, 1989 a device for detecting vibrations like those described above (a multimode optical fiber as the sensing element) is proposed. Jeunhomme device is distinguished from the above described sensors by the fact that a monomode optical fiber is provided between the coherent light source and the input face of the multimode optical fiber and at least one optical fiber, having a core diameter smaller than that of the multimode optical fiber, is provided between the output face of this multimode optical fiber, on which the speckle, appears and at least one associated photodetector.

The present invention is similar to the above devices in that it uses a multimode fiber as the sensing element, and distortion in the geometry of the multimode fiber causes changes the speckle pattern detected at the output face of the multimode fiber. What sets the current invention apart from the prior art is the use of a polarization maintaining fiber between the coherent light source and the input face of the multimode sensing optical fiber. Jeunhomme teaches that the presence of the monomode optical fiber between the coherent light source (proximal or source umbilical fiber) and the input face of the multimode optical fiber has the advantage preventing the disturbance that might occur outside his multimode fiber. Jeunhomme's does not teach or disclose that minor disturbances on the proximal (source) umbilical fiber cause significant disturbances on the speckle pattern on the distal end of the multimode fiber. The current invention eliminates the sensitivity problem by using polarization maintaining single mode fiber.

SUMMARY AND OBJECT OF THE INVENTION

The invention is a contact fiber optic sensor useful for detecting impact, vibration, pressure and acceleration. The sensor system is composed of a fiber trunk, a light source and a light detector. The fiber trunk is a continuous fiber, connected at one end to a light source and a detector at the other end. A length of multimode fiber is spliced within the fiber trunk and serves as the sensing portion of the system. The multimode sensor optical fiber (a fiber capable of carrying two or more modes) is illuminated by a coherent light source. As light propagates down the multimode fiber the light follows different optical paths in the multimode fiber. Optical modes within the multimode optical fiber combined to form an interference pattern. This results in a "speckle" forming at the output face of the multimode fiber. This speckle has a granular mottled appearance.

Each optical path in the multimode sensor fiber is modulated differently by external disturbances, such as impact, vibrations, temperature and/or pressure variations. Any external disturbance of the multimode sensor fiber causes a change in the speckle pattern on the distal face of the multimode fiber. Detection of this change in speckle pattern is performed by a detection system having a smaller diameter than the distal face of the sensing multimode fiber. This detector could be a photo detector whose detection surface is smaller than of the face of the distal end of the sensing fiber or a smaller diameter distal fiber coupled to a photo detector. The photo detector will detect the modulation in light intensity as the speckle pattern changes on the distal face of the multimode fiber. The signal from the photo detector can be amplified or frequency filtered to optimize its output. The wavelength used for the device may vary from visible to 2200 nm (long wavelengths work best). The light source can be a laser or LED (light emitting diode). The light source can be coupled directly into the multimode sensor fiber.

The proximal umbilical (source) fiber must be polarization maintaining fiber. If single mode fiber is used for this input source umbilical fiber minor perturbations of the source fiber cause significant changes of the speckle pattern on the distal face of the multimode fiber. This sensitivity can be eliminated by the use of a Polarization maintaining fiber for the proximal umbilical (source) fiber.

The multimode fiber (sensor fiber) is preferably a step index and not grated index fiber. The distal umbilical (detector) fiber, and/or the detector reading the speckle pattern must have a smaller diameter than the distal face of multimode fiber.

The distal umbilical (detector) cable can be a single mode fiber or polarization maintaining fiber and is not sensitive to perturbation. The photo detector should match the wavelength of source to optimize performance. Signal from the photo detector can be optimized by frequency filtering and amplification.

DETAILED DESCRIPTION OF THE INVENTION

It is an object of the present invention to provide a sensitive means of optical detection of impact, vibration, displacement, acceleration and other forms of physical disturbance. These disturbances may be by externally applied fields, whether mechanical, thermal, electrical, magnetic or otherwise. The sensor system uses a combination of singlemode and multimode optical fibers spliced to produce a spatially filtered subset of modes in a multimode fiber.

It is a further objective of the present invention to produce a spatially filtered subset of modes in a multimode fiber whose modal distribution is extremely sensitive to slight distortions of the fiber and said modes are readily coupled into other modes of the waveguide region of the multimode fiber. The variation in amplitude received at the distal end of the second fiber by a detector produces a signal that tracks the net disturbance of the multimode section of fiber.

The objectives of this invention are fulfilled, in its simplest preferred embodiment, by providing a simple optical fiber link consisting of an optical source, preferably a laser or light emitting diode, a length of singlemode polarization maintain optical fiber, a length of multimode optical fiber, a second length of singlemode optical fiber, and a detector.

Other objects, advantages and novel features of the present invention will become apparent from the following detailed description of the invention when considered in conjunction with the described drawings.

The sensor system comprises, a light source and a light detector, connected to a fiber trunk. The fiber trunk is a continuous fiber, connected at one end to a light source and a detector at to the other end. A length of multimode fiber is spliced within the fiber trunk and serves as the sensing portion of the system. The multimode optical fiber is illuminated by a coherent light source. This results in the light following in different optical paths in the multimodal fiber. Each optical path is modulated differently by external disturbances, such as vibrations, temperature and/or pressure variations. This results in a "speckle" forming at the output face of the multimode optical fiber, as the modes within the multimode optical fiber are combined so as to form an interference pattern. The speckle has a granular mottled appearance. Detecting change in speckle pattern is observed by a detector having a smaller diameter that the distal face of the sensing multimodal fiber. This filter could be a smaller diameter fiber, a single mode fiber or a detector whose face is of a smaller size than of the face of the distal end of the sensing fiber.

The invention described herein is based on the variation in intensity of light detected by the detector collected on the face of the multimode fiber where the speckle is formed. The light intensity is altered by the following mechanism: (a) Spatially dispersed into other guided modes of a multimode core fiber by mode coupling due to extremely low levels of perturbation, (by the multimode fiber sensing portion) and (b) The resulting dispersed energy distribution of spatially dispersed modes being spatially filtered by a fiber of narrow core (Distal singlemode fiber). The light admitted to the last mentioned fiber is detected by a conventional photodetector, which produces an electrical signal proportional to the light intensity admitted thereto.

More details of the basis of the sensor are given below.

The wave numbers (propagation constants) of the guided modes of the multimode fiber are densely packed and close in value. Modeling of wave guide solutions for 1310 nm wavelength light in 50 micron core diameter fiber has revealed that there are many modes so closely spaced that a spatial perturbation along the fiber with a period of 1.5–1.7 cm will cause mode coupling and energy transfer. Intermodal transitions have been found with characteristic periods as large as 6.5 cm, and sometimes much larger. It is a consequence of the close spacing of propagation constants in multimode fibers that very minor perturbations lead to intermodal coupling—an effect observable in the shifting speckle pattern of laser light emitted from the end of multimode fiber. Limiting the population of modes that are initially excited in the multimode fiber (by the proximal polarization maintain single mode fiber), and observing the easily measurable shift in spatial energy distribution under external forces or displacements, may increase the sensitivity of the system.

Those skilled in the art will quickly see that the sensitivity achievable makes the invention competitive with interferometric and phase-sensitive devices, without the complexity of components and auxiliary electronics required to take advantage of such sensitive devices. Simple mechanical or fusion splicing of fibers is all that is necessary to fabricate the sensor fiber components. The light source may be a convenient source of illumination, such as a laser diode or light emitting diode (LED), though other types of illumination may be considered, as those skilled in the art can recognize. The detector may be of a convenient type, such as a semiconductor photodetector with appropriate wavelength response characteristics.

The resulting sensor of the present invention will produce a signal that may be processed for intensity change and frequency content to determine the extent of static and dynamic stress or strain occurring in a structure or material in which the fiber sensor is embedded or bonded to. Appropriately configured, the sensor can also measure acceleration, or other physical field effects.

Further scope of applicability of the present invention will become apparent from the detailed description given hereinafter. However, it should be understood that the detailed description and specific examples, while indicating preferred embodiments of the invention, are given by way of illustration only, since various changes in modifications within the spirit and scope of the invention will become apparent to those skilled in the art from this detailed description.

The present invention is different from the invention of Jeunhomme (U.S. Pat. No. 4,843,233 Jun. 27, 1989) in that: Jeunhomme teaches that light must be introduced into the multimode sensing fiber by a single mode fiber. In the present invention, it is not necessary to introduce the light into the sensing fiber by means of a monomodal (single mode) fiber. Light can be introduced directly into the sensing fiber (multimode) by either a Laser or Led light source. Further, Jeunhomme teaches that the presence of the monomode optical fiber between the coherent light source and the input face of the multimode optical fiber has the advantage preventing the disturbance which might occur outside his multimode fiber, to be monitored for modifying the speckle on the output face, since the monomodal fiber is not influenced by disturbance and since it transmits the light emitted by the light source directed onto the input face of multimode fiber in the detection zone. Jeunhomme's does not teach or disclose that minor disturbances on the proximal (source) umbilical fiber cause significant disturbances on the speckle pattern on the distal end of the multimode fiber.

This sensitivity problem is eliminated in the present invention by using a polarization maintaining single mode fiber.

Further, Jeunhomme teaches that the multimode optical fiber, (his fiber 3) is preferable of the index gradient type, although index jump multimode fiber may also be used. This teaching is poor because I have discovered, as embodied in the present invention that the sensor element of the multimode fiber must be specified as STEP INDEX (jump index). Grated Index fiber is less sensitive. The filter element of the present invention is use for detecting the amount of light seen on the distal face of the sensor multimode fiber. This filter could be a smaller diameter fiber, a single mode fiber or a detector whose face is smaller than the size of the face of the distal end of the sensing fiber.

The current invention is different form U.S. Pat. No. 5,361,313 issued O'Keefe; in that O'Keefe teaches the use of a polarization preserving fiber as the input fiber and a polarization multimode fiber as the sensing portion of the system. The current invention does not use a polarization multimode fiber as the sensing fiber but a step index fiber multimode fiber as the sensor portion of the system. O'Keefe inventions use a polarization effects to achieve the desired objectives while the current invention does not use polarization effect to detect the desired changes.

DETAILED DESCRIPTION OF THE (DRAWINGS) PREFERRED EMBODIMENTS

Figure 1:
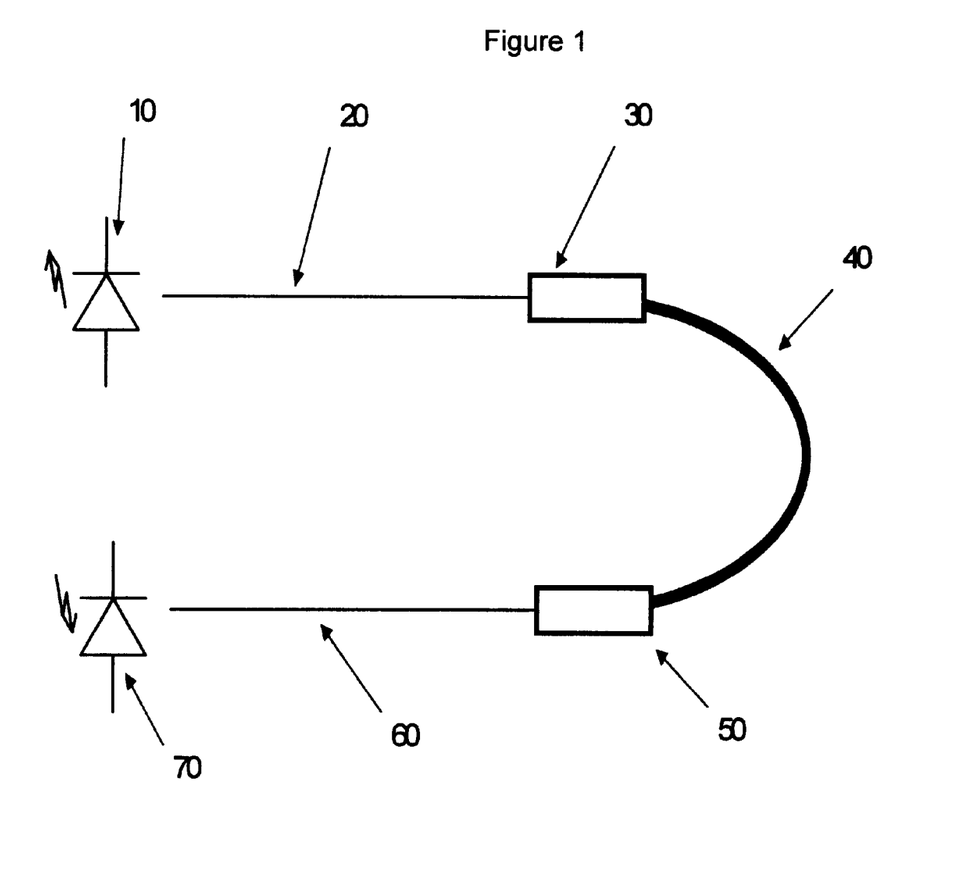
FIG. 1 is a block diagram of the functional elements of this invention.

Referring now to the drawings and the characters of reference marked thereon, FIG. 1 illustrates a preferred embodiment of the present invention in which light generated by an appropriate source is propagated through a system of optical fibers in such a way as to make a designated portion of the fiber sensitive to external forces or perturbations that affect the intensity of the transmitted light energy received at a detector, this embodiment being designated generally as 1. An optical source 10, which may be a diode laser, gas or solid state laser, light emitting diode, or other type of source, emits light into a Polarization maintaining fiber 20. This fiber 20 is connected via a splice connection 30 to a section of sensor fiber 40 that is affected by the presence of a static or dynamic field that causes the fiber 40 to undergo deformation that affects the cylindrical or axial symmetry of the fiber. A second splice connection 50 interfaces the sensor section of fiber a second smaller core diameter fiber 60, which conducts the transmitted light to a detector 70. The splices 30 and 50, respectively, may be conventional connections, such as mechanical adhesive or fusion splice. The small spatial aperture of the singlemode fiber 70, acts as a filter for the speckle pattern produced on the face of the Multimode sensor fiber 40 illustrated in FIG. 2.

Figure 2:
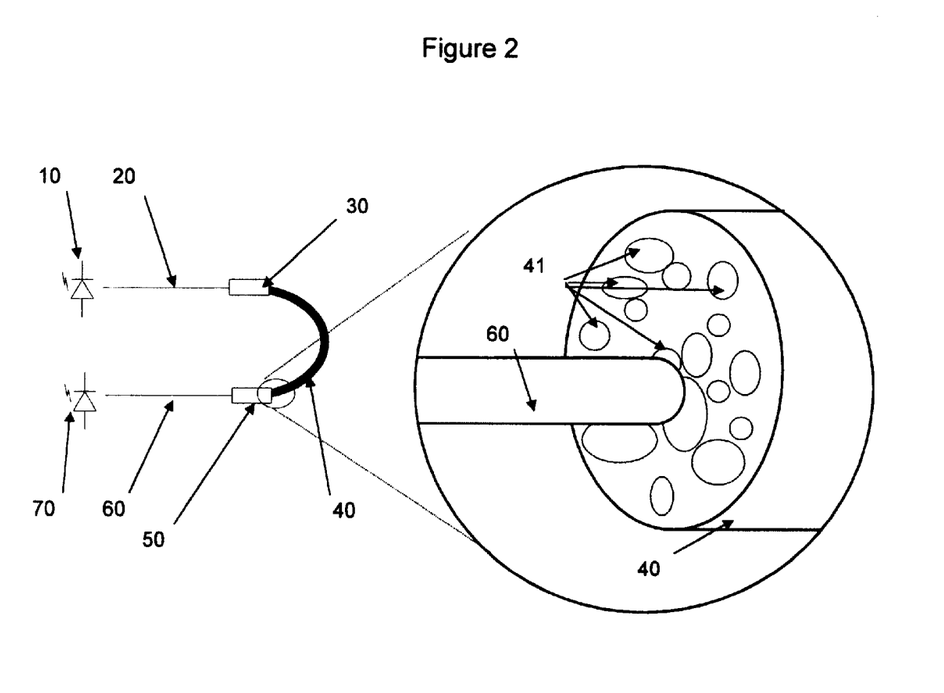
FIG. 2 is a block diagram of the enlarged distal splice of optical fiber pertinent to the design of the invention.

Referring now to FIG. 2, Demonstrates an enlarged section of the distal splice with the splice protection removed. The speckle pattern on the face of the distal end of the sensor fiber is illustrated (41). This speckle pattern changes with perturbation of multimode sensing fiber. For simplicity, details of the splice connection are not shown, but those skilled in the art will recognize that several familiar techniques are readily available to form such splice connections. Under the influence of an applied field, whether of thermal, direct force or pressure or other physical origin, the entire fiber 40, or portions of same, or only the fiber section 40, containing a multimode core, may experience minute deformation from axial symmetry. Under this condition the optical beam propagating in the direction the detector allows for coupling of various modes resulting in a change in the Speckle pattern. The smaller core diameter fiber 60 acts a filter accepting only the smallest changes in intensity or position of an individual speckle of light.

Figure 3:
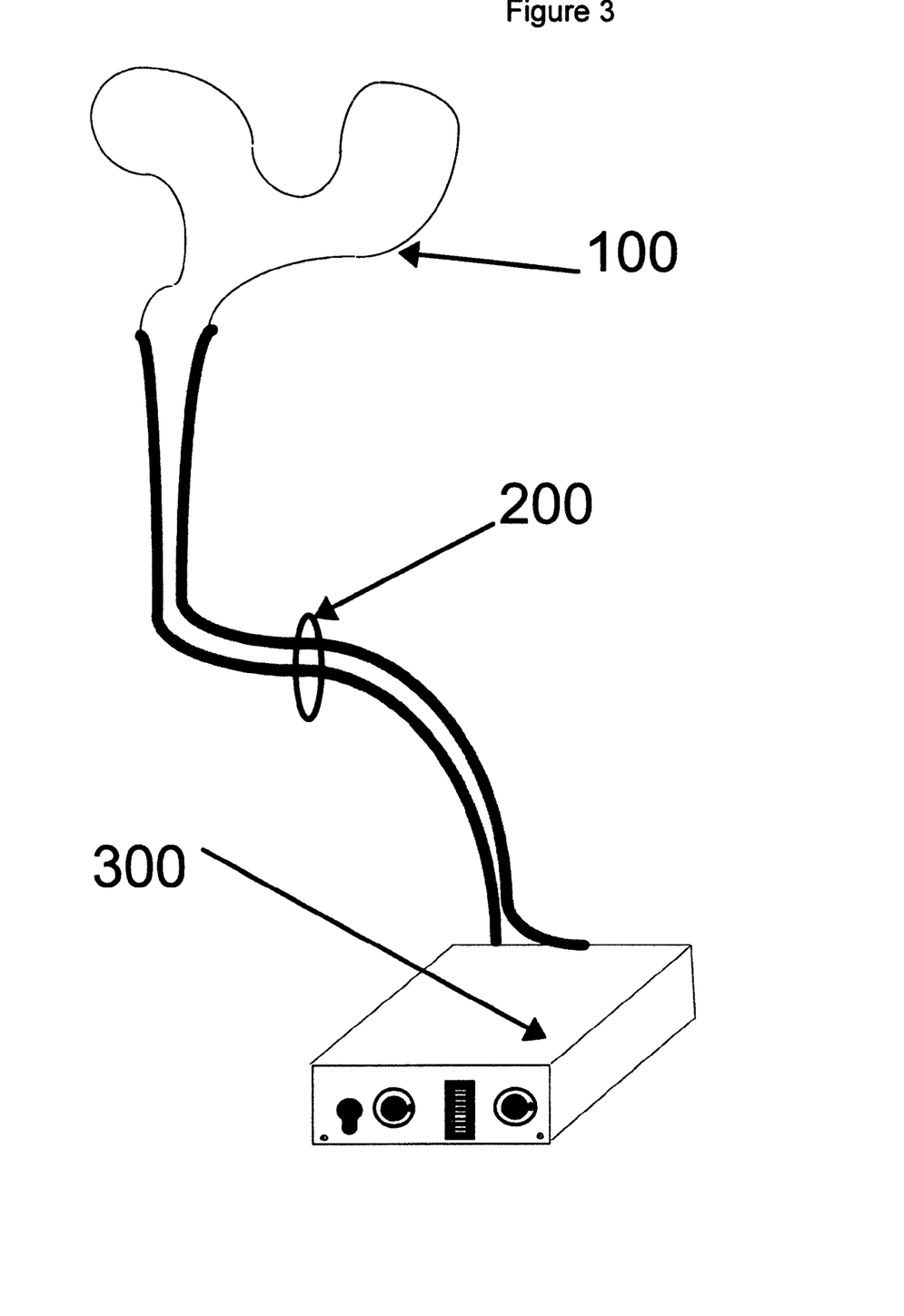
FIG. 3 is the preferred embodiment for "Fiber Optic Impact Sensors."

Each sensor (FIG. 3) consists of single strand of the sensor optical fiber cable 100 connected to an umbilical cable 200. Any perturbation of the sensor fiber changes the amount of light passing through the fiber optic cable. This change in optical intensity can be set to trigger the optoelectronics 300 to either close or open a relay. 200 represents the umbilical cable while 300 represents the optoelectronics box.

Figure 4:
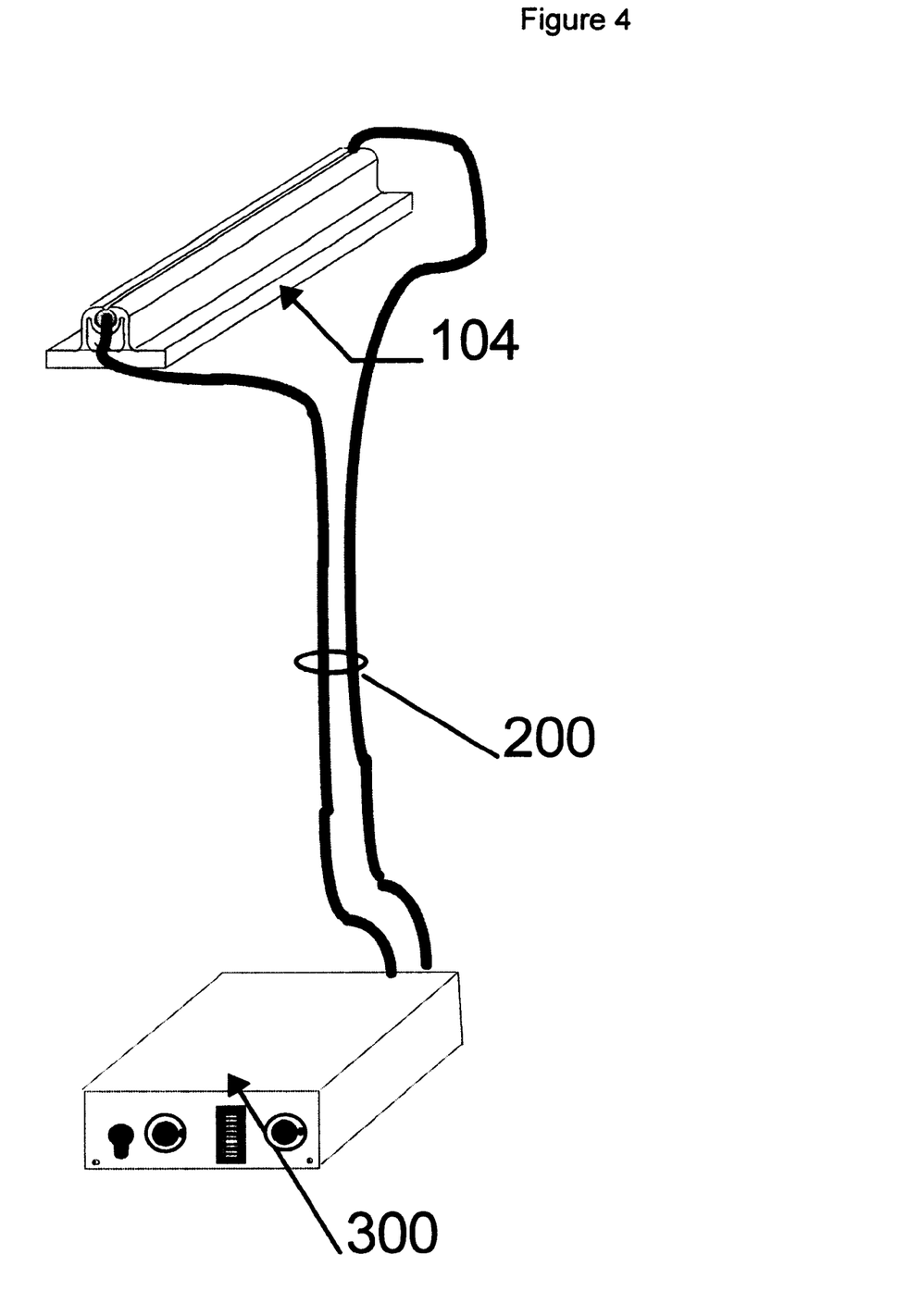
FIG. 4 is a drawing of a preferred embodiment for a "Fiber Optic Impact Edge Sensor."

A fiber optic "edge sensor" (FIG. 4) consists of a flexible rubber or a vinyl extrusion 104 in which the sensor fiber is embedded. Any impact, pressure, vibration on or of the edge sensor can be detected by the fiber sensor. When a certain threshold of pressure or impact is reached the optoelectronic box can trip a relay, which can reverse or stop a motor, or sound a buzzer, or trigger an electrical device. The sensitivity of the device is adjustable down to impact of 1400 ergs. (Equivalent to a dime dropped from one inch.) 200 represents the umbilical cable while 300 represents the optoelectronics box.

Figure 5:
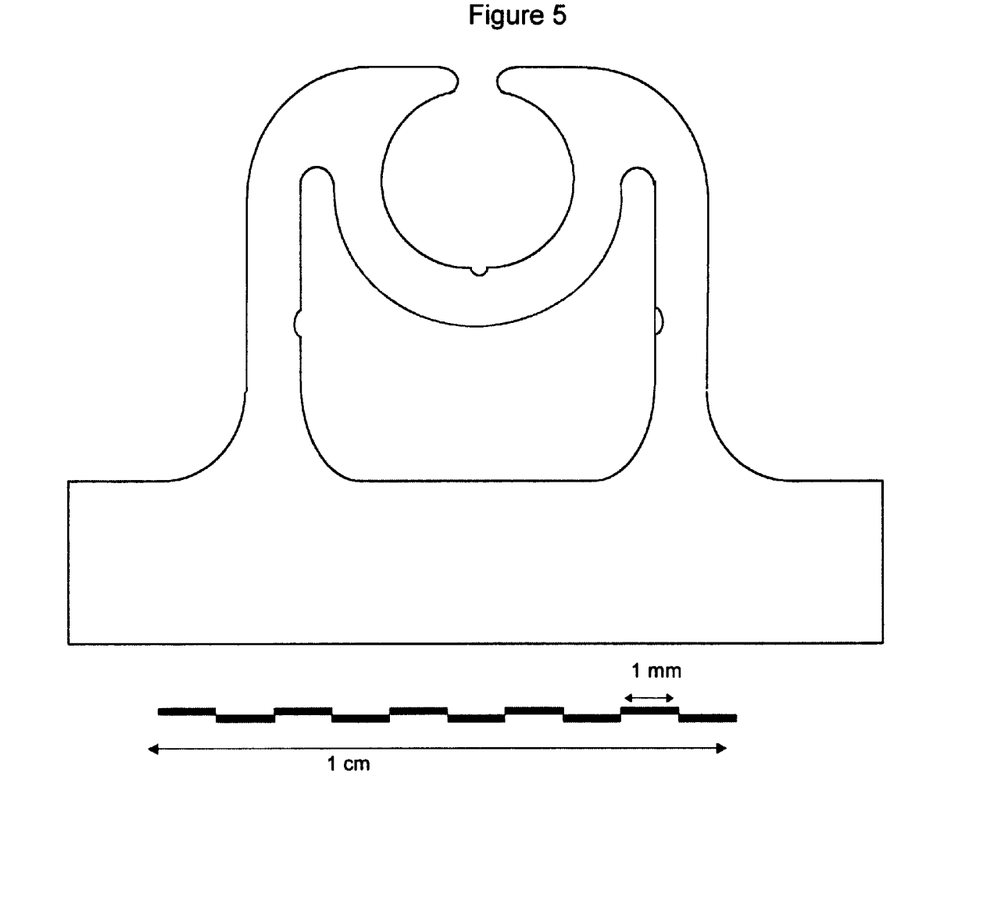
FIG. 5 is a drawing of a magnified view of the preferred embodiment for a "Fiber Optic Impact Edge Sensor."

Details of the edge sensor extrusion are present in (FIG. 5).

Figure 6:
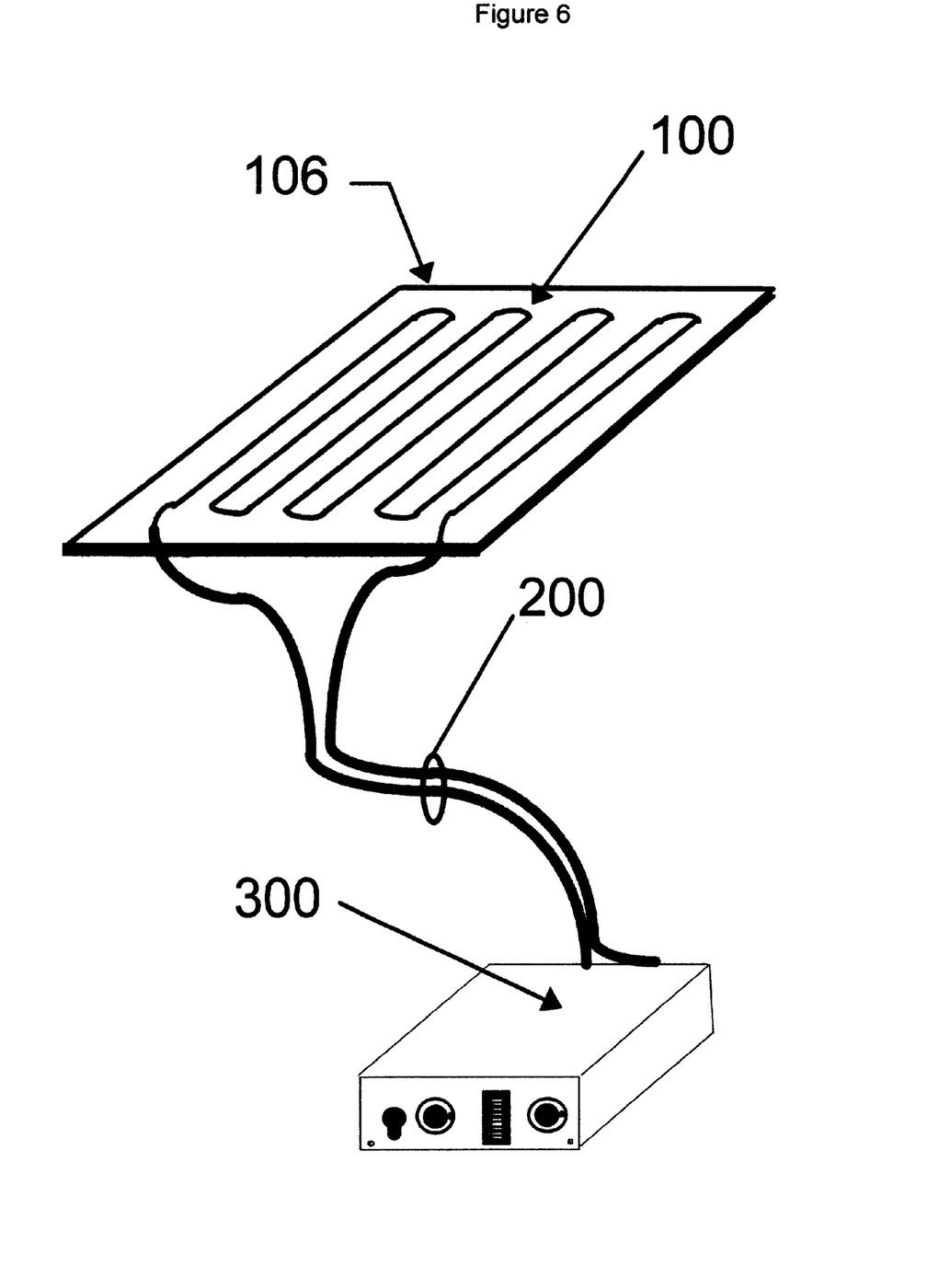
FIG. 6 is a drawing for a preferred embodiment "Fiber Optic Mat Sensor."

A fiber optic mat sensor (FIG. 6) consists of a flexible rubber or vinyl mat 106 in which the sensor fiber 100 is embedded. Any impact, pressure, vibration on or of the mat can be detected by the fiber sensor. When a certain threshold of pressure or impact is reached the optoelectronic box can trip a relay, which can reverse or stop a motor or sound a buzzer or trigger an electrical device. The sensitivity of the device is adjustable down to impact of 1400 ergs. (Equivalent to a dime dropped from one inch) 200 represents the umbilical cable while 300 represents the optoelectronics box.

Figure 7:
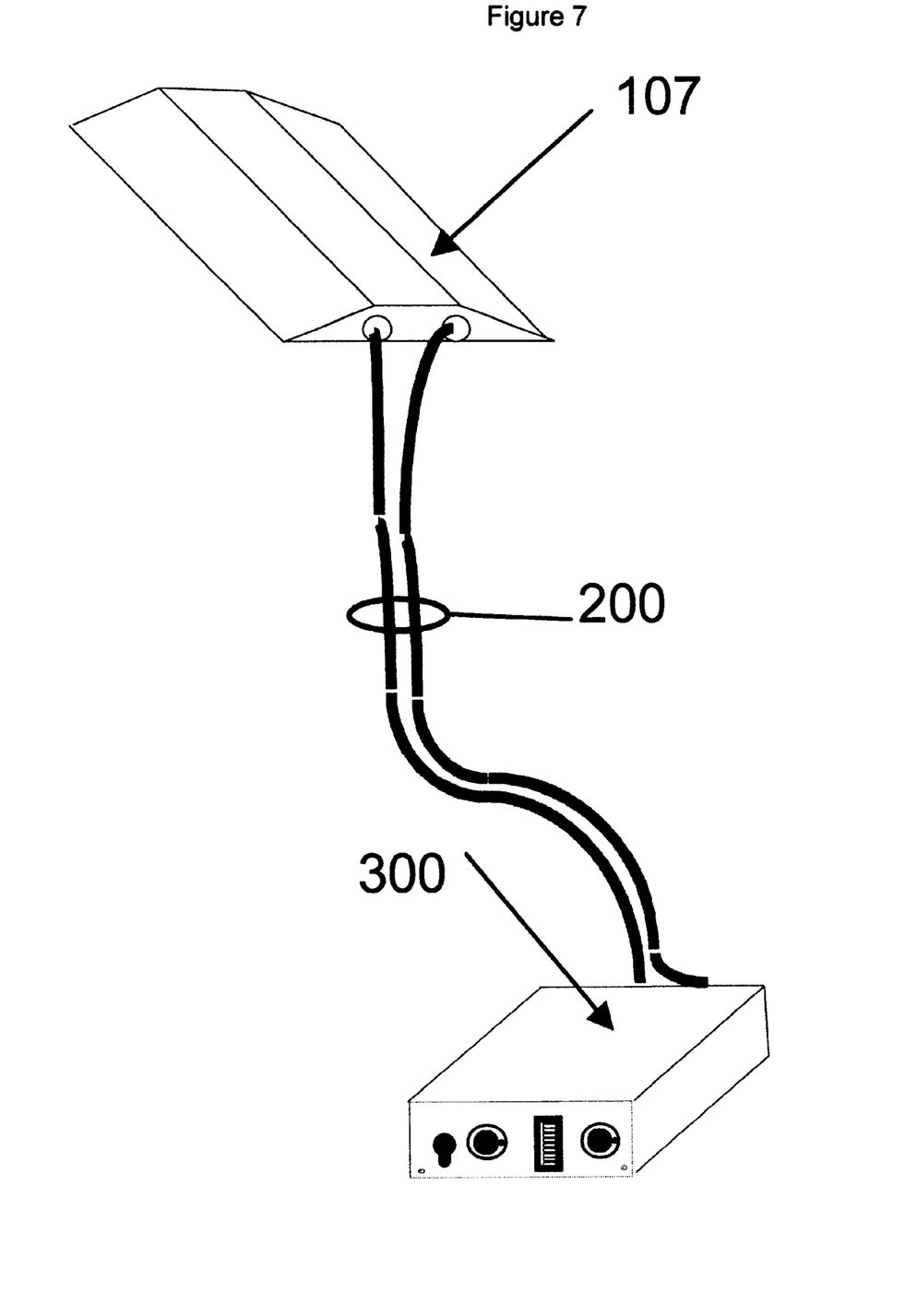
FIG. 7 is a drawing for a preferred embodiment "Fiber Optic Axle Counter Sensor" (vehicle counter and weight in motion sensor).

The Fiber Optic axle counter and weight in motion sensor system (vehicle counter sensor) (FIG. 7) is represented. This device is to be used in automotive traffic control counting the number of vehicles passing a point as well as the weight of each axle of the vehicle. The sensing fiber trunk is embedded in rubber hose or similar extrusion 107. These lengths of extrusion can be manufactured to any length. This extrusion is placed across a street surface. Any impact on the rubber caused by a vehicle passing over the extrusion results in a change in the optical signal. The greater the force of impact (which is proportional to speed and weight) the greater the resultant optical signal. Vehicle speed can be calculated by placing two sensor systems spaced at a calculated distance across the street surface. Knowing the impact force and the speed of the vehicle will enable the user to calculate the weight of each axle crossing the fiber sensor. 200 represents the umbilical cable while 300 represent the optoelectronics box.

Figure 8:
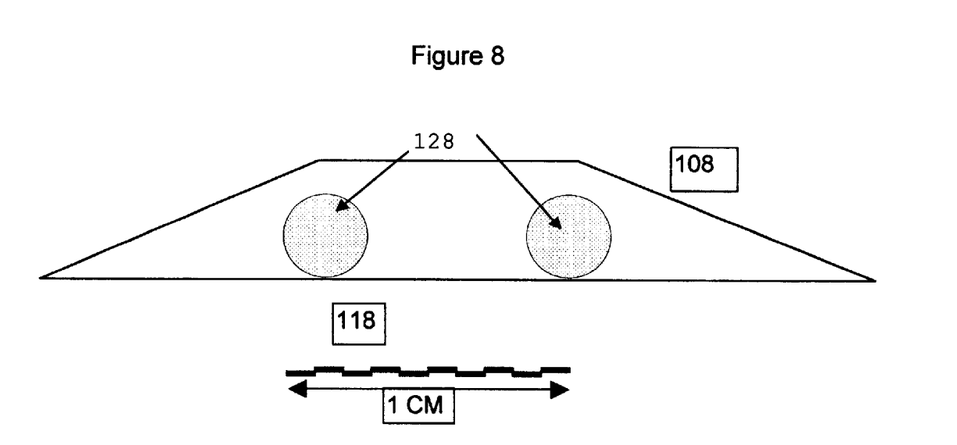
FIG. 8 is a drawing of a magnified view of the preferred embodiment for a "Fiber Optic Axle Counter Sensor."

Details of rubber extrusion used in the Fiber Optic axle counter and weight in motion sensor system are represent in (FIG. 8). 108 represents the vehicle impact surface. 118 represents the road surface while 128 represents the multimode sensor fiber imbedded in the extrusion.

Figure 9:
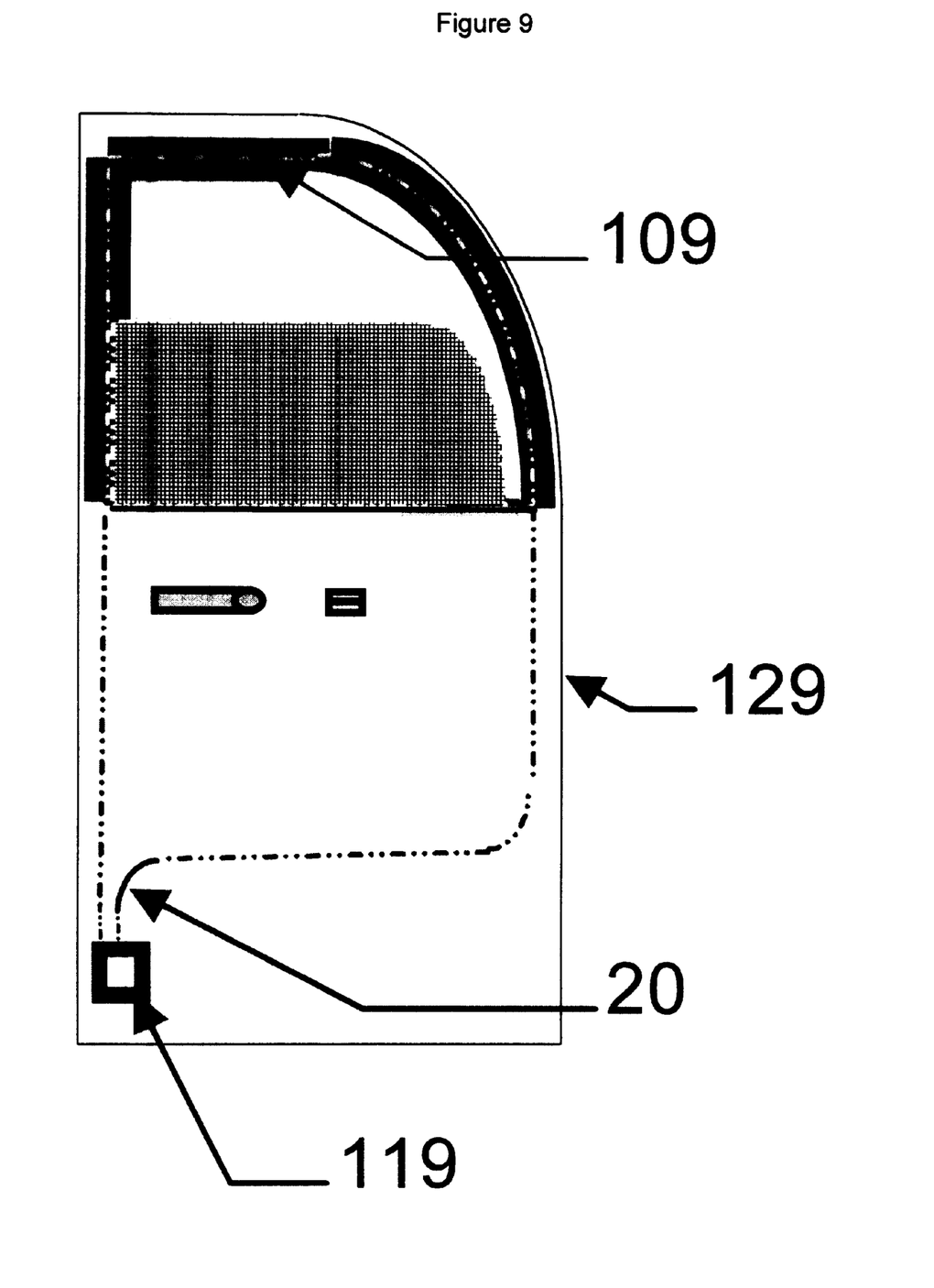
FIG. 9 is a drawing for a preferred embodiment "Pressure/ Compression/Impact Auto Window Anti squeeze Sensor."

The Pressure or Compression or Impact automotive window ("anti squeeze sensor") is represented in (FIG. 9), The fiber optic "anti-squeeze sensor" for car door windows consists of an optoelectronic box and a loop of fiber optic cable. The sensor fiber trunk is imbedded in the window seal 109 and is sensitive to impact and pressure. When a certain threshold of pressure or impact is reached (due to a body part, for example a finger) trapped in a closing window the electrical window motor is programmed to reverse 119 represents the Optoelectronics which when triggered reverses electric window motor 129 represents the car door 200 represent the umbilical cable.

Figure 10:
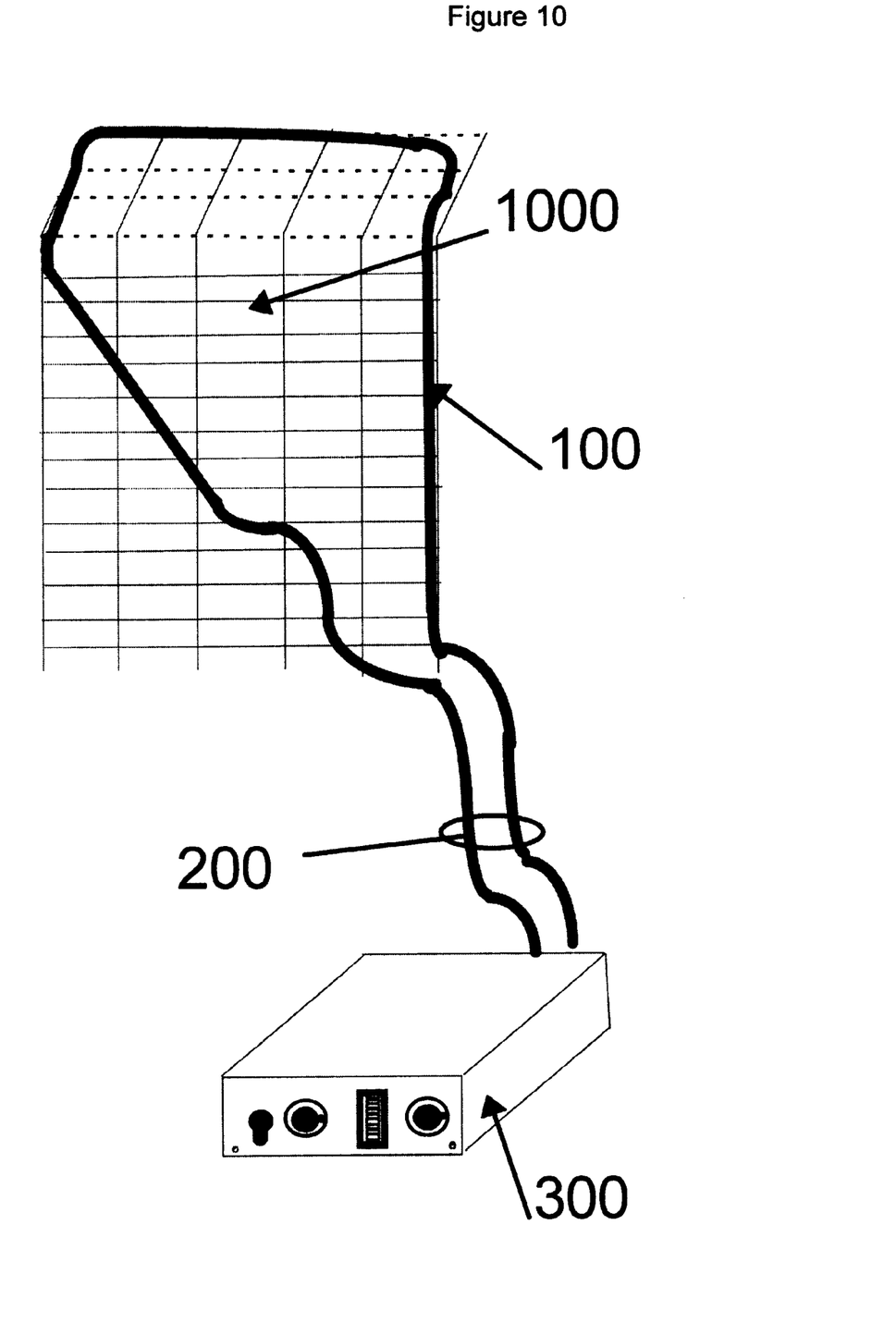
FIG. 10 is a drawing of a preferred embodiment for an intrusion optic sensor incorporated into a fence.

The Intrusion Fiber Optic Sensor is represented in (FIG. 10). The sensor could be used for perimeter security monitoring by either being buried in the ground or attached to a fence 1000. Interruption or perturbation of the fiber sensor 100 will result in a signal change which in turn can trigger a security response. The sensitivity of the sensor can be adjusted 200 represents the umbilical cable while 300 represents the optoelectronics box.

What is claimed is:

1. A sensor for detecting the presence of a foreign object in an electrically operated vehicle window including a motor, a frame and a window pane movable in the frame between an open and closed position, the sensor comprising:

a fiber optic having one end connected to a light source and another end connected to a detector;

a sensing portion fiber within the fiber optic, the sensing portion fiber being located in the frame so as to modulate light in the fiber optic in response to detection of a foreign object in contact therewith; and signal propagating means for transmitting a signal to the motor when the light in the fiber optic is modulated.

2. A sensor as claimed in claim 1 wherein the light source is a coherent light source.

3. A sensor as claimed in claim 1 wherein the fiber optic comprises a single mode fiber connected to the light source.

4. A sensor as claimed in claim 1 wherein the sensing portion comprises a sensing multi-mode fiber optic filament having the ability to transmit more than one mode of a coherent light wavelength.

5. A sensor as claimed in claim 1 further comprising a filtering fiber optic filament having a smaller core diameter than the sensing portion fiber, and a photodetector electronic signal generating means coupled to the filtering fiber optic filament.

* * * * *